United States Patent
Namba et al.

[11] Patent Number: 5,244,552
[45] Date of Patent: Sep. 14, 1993

[54] PROCESS AND APPARATUS FOR WASTE GAS TREATMENT BY MULTI-STAGE ELECTRON BEAM IRRADIATION

[75] Inventors: Hideki Namba; Okihiro Tokunaga; Shoichi Sato, all of Takasaki; Shinji Aoki, Tokyo; Ryoji Suzuki, Tokyo; Masahiro Izutsu, Tokyo; Kyoichi Okamoto, Tokyo, all of Japan

[73] Assignee: Ebara Corporation, Tokyo, Japan

[21] Appl. No.: 721,652

[22] PCT Filed: Dec. 25, 1990

[86] PCT No.: PCT/JP90/01693
§ 371 Date: Aug. 21, 1991
§ 102(e) Date: Aug. 21, 1991

[87] PCT Pub. No.: WO91/09665
PCT Pub. Date: Jul. 11, 1991

[30] Foreign Application Priority Data
Dec. 22, 1989 [JP] Japan ............... 1-331050

[51] Int. Cl.$^5$ .................................. B01D 53/00
[52] U.S. Cl. .......................... 204/157.3; 204/158.2
[58] Field of Search ............... 204/157.3; 250/492.3

[56] References Cited
U.S. PATENT DOCUMENTS
4,435,260 3/1984 Koichi et al. ............... 204/164

FOREIGN PATENT DOCUMENTS
2166284 4/1986 United Kingdom .
2173779 10/1986 United Kingdom .
87/02597 5/1987 World Int. Prop. O. .

OTHER PUBLICATIONS
Japanese Patent Abstract 63-302924, Sep. 12, 1988, "Electron Beam Irradiation Treatment Device for Exhause Gas", Akihiko Maezawa.

Primary Examiner—John Niebling
Assistant Examiner—C. Delacroix-Muirheid
Attorney, Agent, or Firm—Oblon, Spivak, McClelland, Maier & Neustadt

[57] ABSTRACT

A process for desulfurization and denitration of waste gas by multi-stage electron beam irradiation and an apparatus used for the process are constituted so that the waste gas is passed through the electron beam irradiation zones in multiple irradiation chambers that are arranged in such a way that the center-to-center distance (m) between two neighboring electron beam generators is not shorter than distance X calculated by the formula, $X = 2\alpha + tV$ wherein $2\alpha$ means distance over which an absorbed dose extends into a waster gas, t means a residence time (sec.) of waste gas in a non-irradiation zone, and V stands for the flow velocity of waste gas, whereby t can be reduced to 0.01–0.5 seconds, so that irradiated energy can be utilized efficiently and a maximum effect can be obtained with a minimum expenditure of irradiation energy. Therefore, the waste gas can be treated rapidly and economically.

2 Claims, 5 Drawing Sheets

PROCESS AND APPARATUS FOR WASTE GAS TREATMENT BY MULTI-STAGE ELECTRON BEAM IRRADIATION

DESCRIPTION

1. Technical Field

This invention relates to a process for waste gas treatment, particularly to a process and an apparatus for desulfurization and/or denitration of waste gas by multi-stage electron beam irradiation.

2. Background Art

There has heretofore been developed a process for waste gas treatment, which comprises introducing a waste gas containing sulfur oxides and/or nitrogen oxides into an electron beam irradiation chamber and irradiating the waste gas with an electron beam, adding ammonia to the waste gas before and/or after the electron beam irradiation, removing the resulting by-product by means of a dust collector, and discharging the waste gas into the atmosphere. Further, improvements for the above process have been studied. With respect to the process for waste gas treatment using a multi-stage electron beam irradiation apparatus, a process using a plurality of irradiation units is proposed in "Process and Apparatus for Desulfurization and Denitration of Waste Gas by Multi-stage Electron Beam Irradiation" (Japanese Patent Publication No. 40052/1984). The document makes no theoretical description as to why the multi-stage irradiation provides increased desulfurization and denitration rates. That is, the document makes no mention of the distance of two neighboring electron beam generators in an operational plant. Similarly, no mention is made of the effect of non-irradiation zone(s), in "Process for Selectively or Simultaneously Separating Harmful Substances from Waste Gas by Electron Beam Irradiation" (Japanese Patent Publication No. 501142/1988).

As described above, there has heretofore been known a process for waste gas treatment using a plurality of electron beam generators. However, it has not been known with regard to the process exactly how the multiple electron beam generators should be arranged. For example, the residence time in the non-irradiation zone(s) has been considered to take several seconds to several tens of seconds as described hereinafter. Therefore, it has been assumed that a concrete building which shields the irradiation chamber and the electron beam generators would have to be very big.

Hence, it is an object of the present invention to set the conditions for arranging a plurality of electron beam generators and thereby to provide a multi-stage electron beam irradiation apparatus capable of effecting electron beam irradiation efficiently and treating a waste gas economically as well as a process for waste gas treatment using said apparatus.

DISCLOSURE OF INVENTION

In order to achieve the above object, the present invention provides a multi-stage electron beam irradiation apparatus for waste gas treatment, comprising an electron beam irradiation chamber accommodating a plurality of electron beam generators, wherein the acceleration voltage of the electron beam is 300–3,000 KV, the flow velocity of said waste gas is not more than 30 m/sec and the temperature of said waste gas to be treated is not lower than the dew point but not higher than 100° C., and the center-to-center distance between two neighboring electron beam generators is not shorter than distance X calculated from the following formula:

$$X = 2\alpha + tV$$

wherein X=center-to-center distance (m) between two neighboring electron beam generators,
- $2\alpha$ = distance (m) over which absorbed dose extends in waste gas, (the direction of this distance intersects the flow direction of waste gas and the direction opposite thereto; the distance refers to a distance up to a point where substantially no electron beam reaction takes place and varies depending upon the acceleration voltage of electron beam generators, the temperature of waste gas and the composition of waste gas)
- V = flow velocity (m/sec) of waste gas; and
- t = residence time (sec.) of waste gas in a non irradiation zone, (this time is about 0.01–0.5 seconds).

In the above formula, t is 0.1–0.5 and refers to a residence time (sec.) at a site (non-irradiation zone) where substantially no electron beam reaction takes place. This value is based on the result of two-stage irradiation test shown in Examples.

In order to achieve another object, the present invention provides a process for waste gas treatment by electron beam irradiation, which comprises introducing a waste gas containing sulfur oxides and/or nitrogen oxides into an electron beam irradiation chamber and irradiating the waste gas with an electron beam, adding ammonia to the waste gas before and/or after the electron beam irradiation, removing the resulting by-product by means of a dust collector, then discharging the waste gas into the atmosphere, said process being characterized in that the residence time of the waste gas in the non-irradiation zone between two neighboring electron beam irradiation zones is 0.01–0.5 seconds and that the waste gas is passed through each irradiation zone in order.

In the formula, the distance ($\alpha$) over which the absorbed dose extends varies depending upon the acceleration voltage of an electron beam accelerator, the temperature of a waste gas and the composition of the waste gas. In Table 1, there are shown reference data of voltage, $\alpha$ and X. These data are for the case where the waste gas temperature was 80° C. and the waste gas velocity (V) was 10 m/sec.

TABLE 1

| Voltage (KV) | α (m) | X (m) |
|---|---|---|
| 300 | 0.4 | 0.9 |
| 500 | 0.5 | 1.1 |
| 800 | 1.0 | 2.1 |
| 1,000 | 1.2 | 2.5 |
| 1,500 | 1.4 | 3.0 |
| 2,000 | 1.5 | 3.1 |
| 3,000 | 1.7 | 3.5 |

BEST MODE OF CARRYING OUT THE INVENTION

Figure 1:
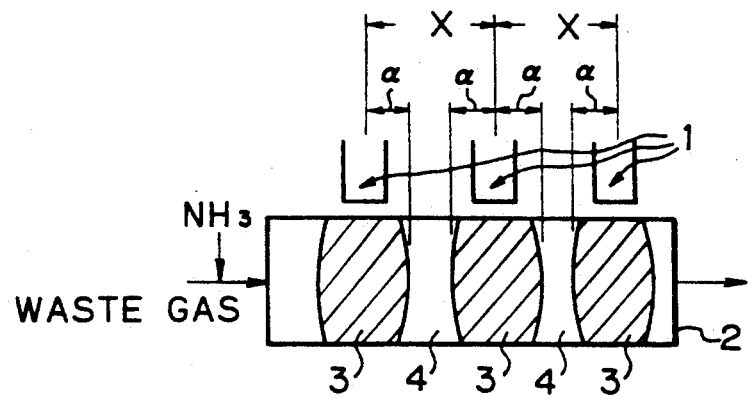
FIG. 1 shows a schematic view of the multi-stage electron beam irradiation apparatus (irradiation from one side) of the present invention.

The present inventors confirmed that the efficiency of nitrogen oxide removal can be improved by arranging non-irradiation zone(s) between electron beam irradiation vessels.

It is thought that the denitration reaction in electron beam irradiation zone(s) proceeds as shown by the formulas (2) to (8) below, wherein the OH, O and $HO_2$ radicals generated by electron beam irradiation as shown in the formula (1) act as reactive substances.

$$O_2, H_2O \rightarrow OH'', O'', HO_2'' \qquad (1)$$

(OH$\Delta$, O$\Delta$ and $HO_2''$ each refers to a radical)

$$NO + OH'' \rightarrow HNO_2 \qquad (2)$$

$$HNO_2 + 1/2 O_2 + NH_3 \rightarrow NH_4NO_3 \qquad (3)$$

$$NO + O'' \rightarrow NO_2 \qquad (4)$$

$$NO_2 + \tfrac{1}{2} H_2O + \tfrac{1}{4} O_2 + NH_3 \rightarrow NH_4NO_3 \qquad (5)$$

$$NO + HO_2'' \rightarrow HNO_3 \qquad (6)$$

$$NO_2 + OH'' \rightarrow HNO_3 \qquad (7)$$

$$HNO_3 + NH_3 \rightarrow NH_4NO_3 \qquad (8)$$

Now, particular attention is paid to the reactions of the O radical. The O radical is generated in the electron beam irradiation zone(s), according to the formula (1), and this O radical also generates ozone according to the formula (9). This ozone oxidizes NO and converts it to $NO_2$ according to the formula (10), and the $NO_2$ is fixed as ammonium nitrate according to the formula (5).

$$O_2 + O'' \rightarrow O_3 \qquad (9)$$

$$NO + O_3 \rightarrow NO_2 + O_2 \qquad (10)$$

$$NO_2 + \tfrac{1}{2} H_2O + \tfrac{1}{4} O_2 + NH_3 \rightarrow NH_4NO_3 \qquad (5)$$

Simultaneously with these reactions, there also occur reactions as shown by the formula (11) or (12) wherein the O radical is consumed. The reactions shown by the formula (11) or (12) are not intended reactions but reactions which waste the O radical and, accordingly, are not preferred.

$$NO_2 + O'' \rightarrow NO + O_2 \qquad (11)$$

$$O_3 + O'' \rightarrow 2 O_2 \qquad (12)$$

As mentioned above, the denitration reaction is based on radicals. The denitration reaction is largely divided into reactions [the formula (6), the formula (7)→the formula (8)] wherein NOx is oxidized by radicals and converted to $NH_4NO_3$, and reactions [the formula (4)→the formula (5)]. It was also found that there also takes place a reaction [the formula (9)→the formula (10)] wherein $NO_2$ is generated.

It was also found that simultaneously with these reactions there also takes place a reaction as shown by the formula (11) wherein the $NO_2$ generated by the formula (4) or (10) reacts with the O radical and returns to NO, and a reaction as shown by the formula (12) wherein ozone and the O radical disappear. According to the formula (11) and the formula (12), it became clear that prolonged electron beam gives no further improvement in the concentration of NOx removed and merely results in a waste of energy.

The formula (5) and the formula (11) describe competitive reactions. However, the reaction shown by the formula (11) is caused by a radical and is very rapid. Therefore, as long as irradiation is effected (that is, as long as the radical is kept fed), the reaction of formula (5) hardly proceeds.

If it is possible to allow the formula (5) to proceed without the occurrence of the formula (11) and the formula (12), maximum effect can be obtained with a minimum expenditure of electron beam irradiation energy. The means for achieving this is to stop the generation of radicals, that is, to stop the irradiation of electron beam. By stopping the irradiation, the formulas (11) and (12) do not proceed and denitration proceeds in accordance with the formula (5). If the irradiation of electron beam is restarted when $NO_2$ and $O_3$ have substantially disappeared in the waste gas to be treated, according to the formulas (5) and (10) (at this time, the unreacted NO still exists), denitration can be effected efficiently by the reactions consisting mainly of the formulas (1) to (8).

Now, the important point is the time at which $NO_2$ gas disappears substantially in the waste gas to be treated, according to the formula (5). Ordinarily, the gas-gas thermal reaction shown by the formula (5) is slow and is considered to take several seconds to several tens of seconds. Unexpectedly, however, the present invention made a surprising discovery with regard to this process. That is, it was found that when ammonium nitrate, ammonium sulfate and ammonium sulfate-nitrate coexist as products of electron beam irradiation, the formula (5) proceeds incredibly rapidly on the surfaces of the above products. Various tests revealed that by suspending electron beam irradiation for at least 0.01 second, the reaction proceeds according to formula (5) by taking advantage of those products and $NO_2$ substantially disappears from the waste gas to be treated. Thus, the basic conditions necessary for designing a multistage electron beam irradiation apparatus have become clear, which conditions were unable to be predicted in the conventional techniques. It has also become clear that contrary to our prediction, the residence time of waste gas in non-irradiation zone(s) may be as short as 0.01-0.5 second and be economical.

Below, using the example of a 260 KW coal-fired power plant (a gas volume of 900,000 Nm³/hr) are established the residence time of waste gas in the non-irradiation zone(s) of an operational unit.

Figure 6:
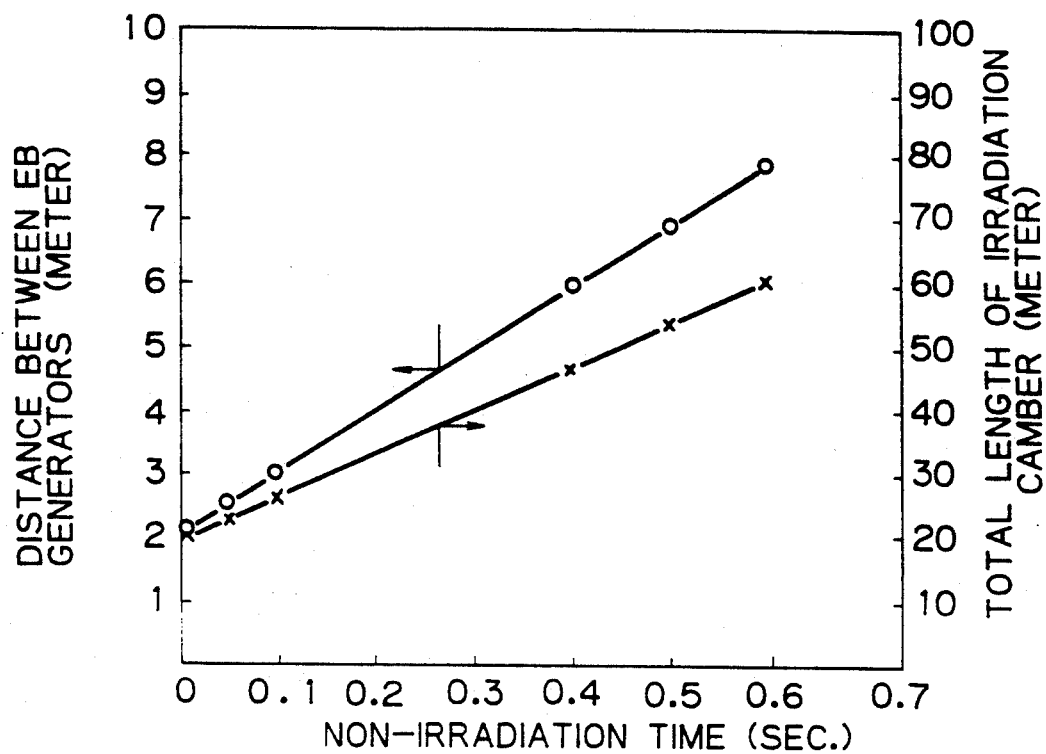
FIG. 6 is a graph showing the relationship between the non-irradiation time and the center-to-center distance (x) between two neighboring electron beam generators and the relationship between the non-irradiation time and the total length of the irradiation chamber.

From Example 1, the lower limit of the residence time is found to be 0.01 second. FIG. 6 plots the relationship between the non-irradiation time and the center-to-center distance (x) between two neighboring electron beam generators of 800 KV, with a gas velocity of 10 m/sec and at a gas temperature of 80° C. The required distance (x) increases with the non-irradiation time. For a non-irradiation time of 0.01 second, a distance of 2.1 m is required, for 0.5 seconds, 7 m is required, and for 0.6 seconds, 8 m is required. To treat 900,000 Nm$^3$/hr of waste gas with an $SO_2$ concentration of 1,500 ppm and NOx concentration of 250 ppm in order to achieve a desulfurization efficiency of 96% and a denitration efficiency of 80%, it may be required to employ 8 electron beam generators having a capacity of 800 kV×500 mA (400 kW).

With a non-irradiation time of only 0.01 second, the total length of the irradiation chamber required for installing 8 units of accelerator is about 20 m [2.1 m × 7 (non-irradiation zones)+5.3 m]. 5.3 m represents the combined length of the required gas inlet and outlet positions. For a non-irradiation time of 0.5 seconds, the total length is about 54.3 m [7 m × 7 (non-irradiation zones)+5.3 m] and for 0.6 seconds, about 61.3 m [8 m × 7 (non-irradiation zones)+5.3 m], is necessary, which is very long (see FIG. 6).

As is well known, the generation of electron beams is accompanied by a very intense X-rays which although having a small energy, require careful shielding in the electron beam generators and irradiation chamber. As such, a concrete enclosure of about 1 m thickness is required. Consequently, not only is the direct cost of the irradiation chamber increased, but also the total building costs including the shielding is greatly increased.

Figure 7:
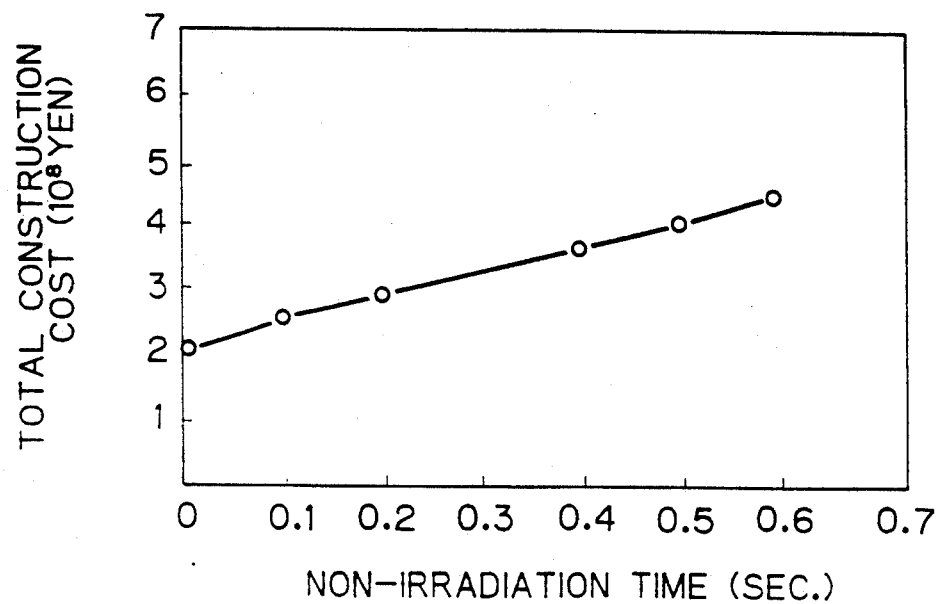
FIG. 7 is a graph showing the relationships between the non-irradiation time and the total construction cost of the irradiation chambers and the shielding building.

FIG. 7 plots the relationship between the non-irradiation time and the total construction cost of the irradiation chamber and shielding building. While the non-irradiation time of 0.01 second results in a cost of 200 million yen, the cost increases to about 400 million yen for 0.5 seconds and for a greater residence time, i.e., 0.6 seconds, the cost rises to about 440 million yen.

Given the above, it is preferable for the residence time in the non-irradiation zone(s) in an operational plant to be limited to a maximum of 0.5 seconds, at which the construction cost can still be held at less than twice that of the minimum non-irradiation time, 0.01 second. [Examples]

The present invention is now described by means of Examples. However, the present invention is not restricted to the following Examples.

Figure 2:
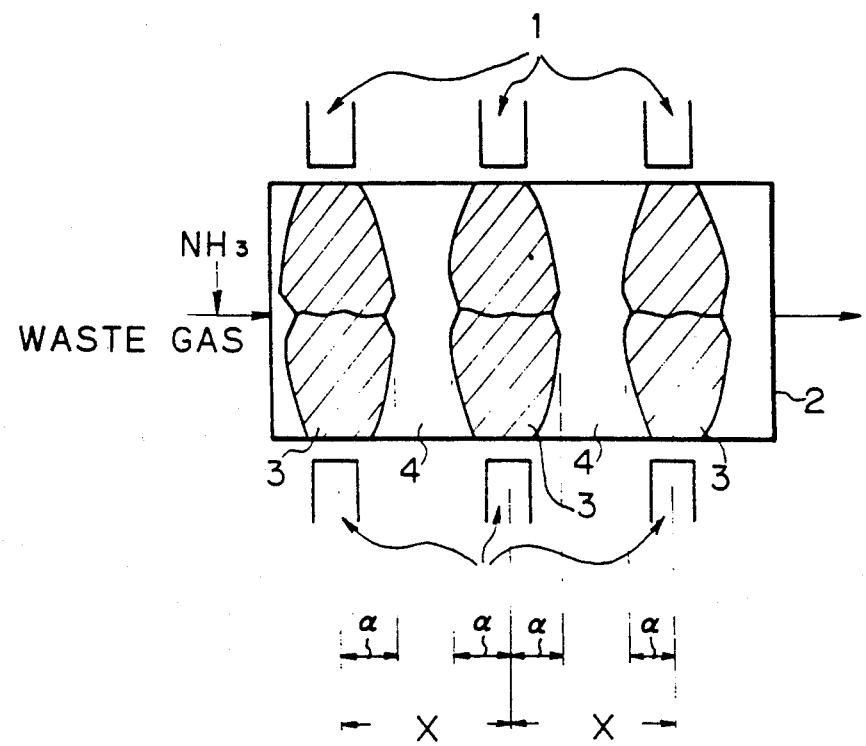
FIG. 2 shows a schematic view of the multi-stage electron beam irradiation apparatus (irradiation from both sides) of the present invention.

FIG. 1 and FIG. 2 each show a schematic view of a multi-stage electron beam irradiation apparatus. FIG. 1 illustrates irradiation from one side and FIG. 2 illustrates irradiation from both sides. In FIG. 1 and FIG. 2, numeral 1 refers to an electron beam generator; numeral 2 refers to an electron beam irradiation chamber; numeral 3 refers to an irradiation zone; and numeral 4 refers to a non-irradiation zone.

In FIG. 1 and FIG. 2, the center-to-center distance between two neighboring electron beam generators is at least the X (m) defined by the formula given hereinbefore, whereby the residence time of waste gas in non-irradiation zone(s) can be adjusted to 0.01–0.5 second.

EXAMPLE 1

To a waste gas having a flow rate of 15 Nl/min, an initial $NO_x$ concentration of 400 ppm and an initial $SO_2$ concentration of 1,720 ppm, ammonia gas was added so that the ammonia concentration in the mixed gas became 3,460 ppm. Then, the mixed gas was subjected to an electron beam irradiation test using irradiation vessels of two stages. Six test conditions were set so that the residence time in the non-irradiation zone between the first-stage irradiation vessel and the second-stage irradiation vessel became 0 second (one stage irradiation test), 0.005 seconds, 0.01 second, 0.05 seconds, 0.1 second or 0.4 seconds. The residence time in the non-irradiation zone was set by changing the inside diameter or length of the pipe between the first-stage and second-stage irradiation vessels.

Figure 3:
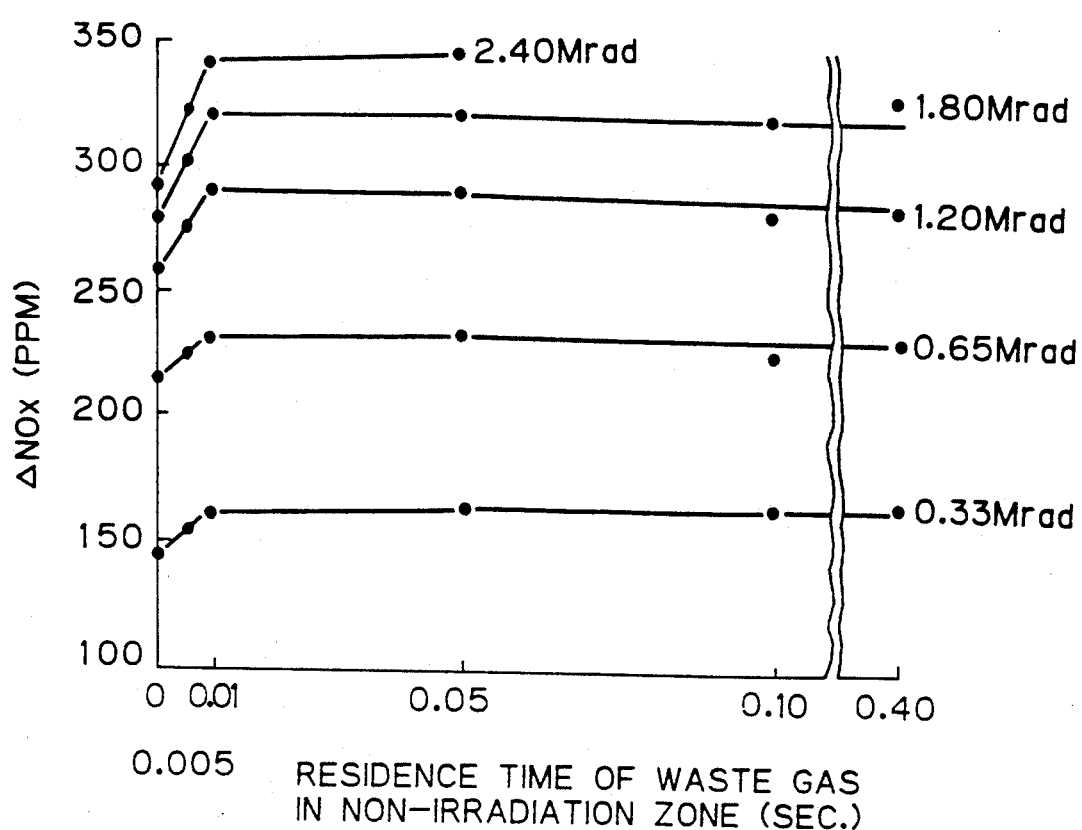
FIG. 3 is a graph showing the relationship between the residence time of waste gas in a non-irradiation zone and the concentration ($\Delta NO_x$) of $NO_x$ removed.

The results are summarized in Table 2. In Table 2, residence time is the residence time in a non-irradiation zone, and $\Delta NO_x$ is the concentration of $NO_x$ removed. The relationship between the residence time and $\Delta NO_x$ is shown in the graph of FIG. 3, where the axis of abscissas is the residence time and the axis of ordinates is $\Delta NO_x$. According to the results, $\Delta NO_x$'s (the concentrations of $NO_x$ removed) in all the residence times of the two-stage irradiation test were substantially the same (except 0.005 seconds) and larger than $\Delta NO_x$ for zero residence time (the one-stage irradiation test). Further, the reaction temperature was kept at about 80° C.

Figure 4:
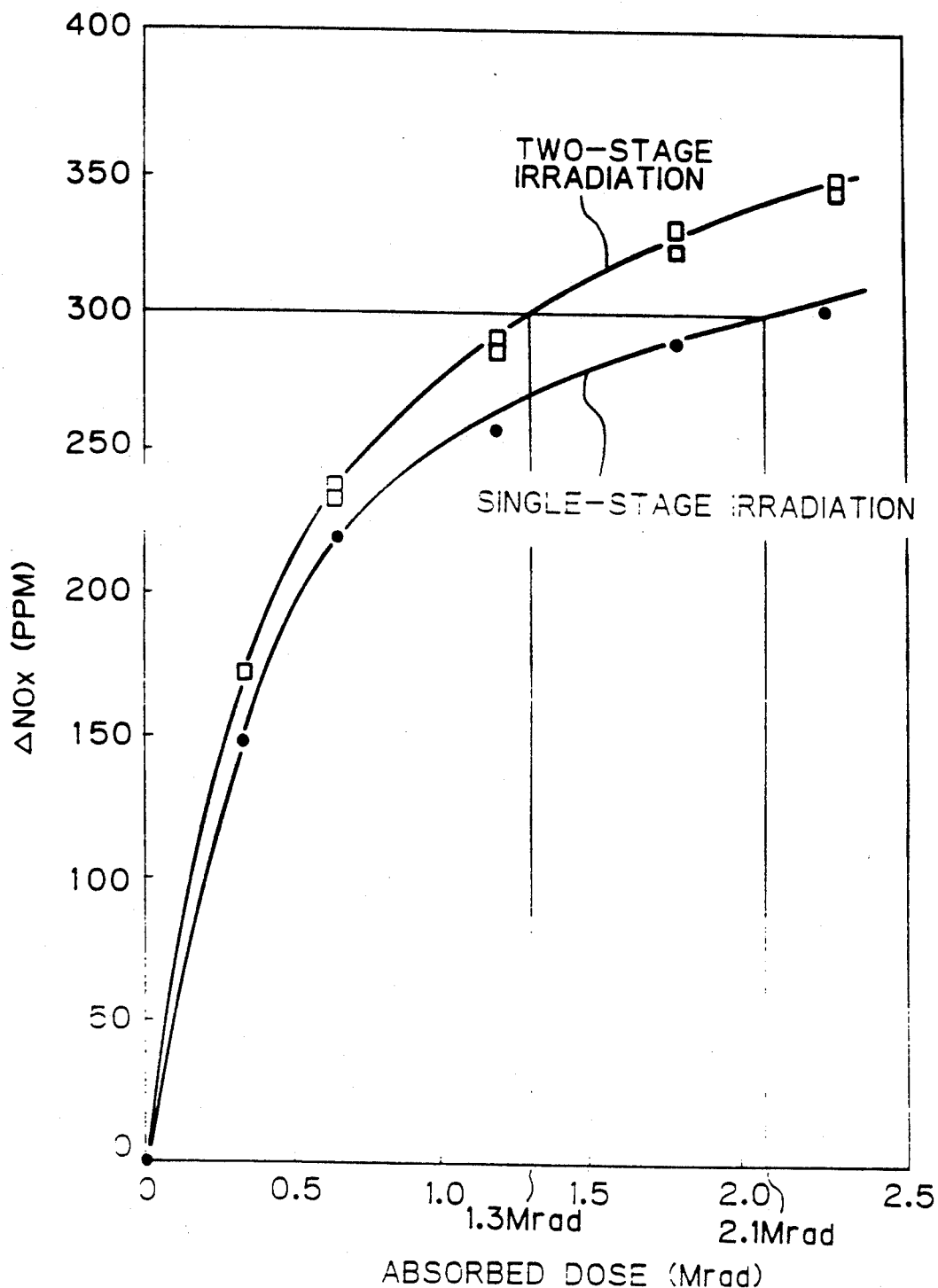
FIG. 4 is a graph showing the relationships between the dose (Mrad) absorbed by a waste gas and the concentration ($\Delta NO_x$) of $NO_x$ removed.
Figure 5:
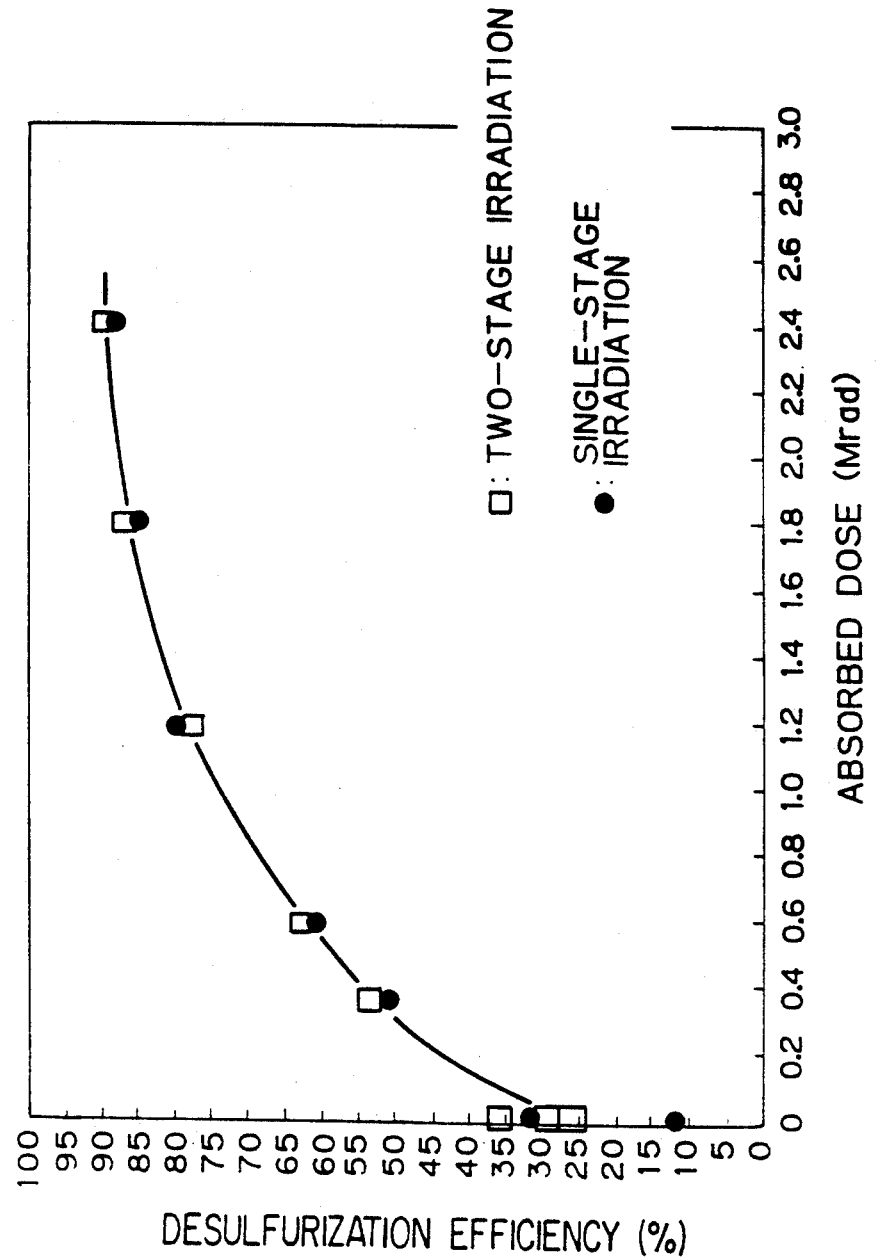
FIG. 5 is a graph showing relationships between the absorbed dose (Mrad) and the efficiency of desulfurization.

The relationship between the dose absorbed by the waste gas and the concentration of $NO_x$ removed ($NO_x$) is shown in the graph of FIG. 4. From the graph, it can be seen that in order to remove 300 ppm of $NO_x$ (denitration efficiency 75%), 2.1 Mrad of irradiation was required in the single-stage irradiation, while 1.3 Mrad of irradiation was required in the two-stage irradiation. Accordingly, the irradiation dose in the two-stage irradiation was reduced by 0.8 Mrad (38%). The results of desulfurization are shown in the graph of FIG. 5. From the graph, it can be seen that both the single-stage and the two-stage irradiation are equally applicable.

TABLE 2

| Irradiation condition Residence time Dose (Mrad) | One-stage condition 0 sec $\Delta NO_x$ ppm | Two-stage irradiation | | | | |
|---|---|---|---|---|---|---|
| | | 0.005 sec $\Delta NO_x$ ppm | 0.01 sec $\Delta NO_x$ ppm | 0.05 sec $\Delta NO_x$ ppm | 0.1 sec $\Delta NO_x$ ppm | 0.4 sec $\Delta NO_x$ ppm |
| 0.00 | 0 | 0 | 0 | 0 | 0 | 0 |
| 0.33 | 143 | 151 | 160 | 166 | 162 | 171 |
| 0.65 | 213 | 222 | 230 | 236 | 227 | 232 |
| 1.20 | 258 | 274 | 290 | 291 | 282 | 286 |
| 1.80 | 278 | 299 | 320 | 321 | 322 | 331 |
| 2.40 | 293 | 317 | 340 | 345 | — | — |

EXAMPLE 2

To a waste gas having a flow rate of 1,200 Nm$^3$/h, an initial $NO_x$ concentration of about 350 ppm and an initial $SO_2$ concentration of 1,600 ppm, ammonia gas was added so that the average concentration of ammonia in the mixed gas became about 3,200 ppm. Then, the mixed gas was subjected to an electron beam irradiation test at about 70° C. of the reaction temperature using a single-stage irradiation vessel and a two-stage vessel. The residence time of the waste gas in each non-irradiation zone was 0.5 seconds.

In order to achieve 80% denitration, 80% ($\Delta NO_x$, 280 ppm), there was required 1.5 Mrad of the irradiation dose in the two-stage irradiation, and 2.0 Mrad (33% higher than the former) of the irradiation dose in the single stage irradiation. The desulfurization in the single stage and the two-stage irradiation gave the same result, and the efficiency of desulfurization was about 94%. The results are summarized in Table 3.

TABLE 3

| Irradiation case | Inlet concentration | First irradiation dose | First outlet gas concentration | Second irradiation dose | Second outlet gas concentation |
|---|---|---|---|---|---|
| Two-stage | $NO_x$ = 350 ppm $SO_2$ = 1,600 ppm | 0.75 Mrad | $NO_x$ = 160 ppm (54% denitration) $SO_2$ = 400 ppm (75% desulfurization) | 0.75 Mrad (total dose: 1.5 Mrad) | $NO_x$ = 70 ppm (total denitration: 80%) $SO_2$ = 100 ppm (total desulfurization: 94%) |
| Single-stage | $NO_x$ = 350 ppm $SO_2$ = 1,600 ppm | 2.0 Mrad | $NO_x$ = 70 ppm (80% denitration) $SO_2$ = 100 ppm (94% desulfurization) | — | — |

Industrial Applicability

The method and apparatus of the present invention for performing a waste gas treatment in the manner described hereinabove, achieve efficient utilization of irradiation energy to produce maximum results with minimum irradiation. Hence, the present invention is suitable for accomplishing waste gas treatments in a rapid and economical manner.

We claim:

1. A process for waste gas treatment by multi-stage electron beam irradiation, which comprises:
   introducing waste gas containing sulfur oxides, nitrogen oxides, or combinations thereof into an electron beam irradiation chamber having alternating irradiation and nonirradiation zones;
   irradiating the waste gas with an electron beam at an acceleration voltage of 300-3,000 KV, the flow velocity of said waste gas being not more than 30 m/sec and the temperature of said waste gas to be treated being not less than the dew point but not higher than 100° C.;
   adding ammonia to the waste gas before, after or both before and after electron beam irradiation;
   passing the waste gas through successive irradiation zones in such a manner that the residence time of the waste gas in a non-irradiation zone between two neighboring electron beam irradiation zones is 0.01-0.5 seconds;
   removing the resulting by-products by means of a dust collector; and then discharging the waste gas into the atmosphere.

2. In a multi-stage electron beam irradiation apparatus for waste gas treatment, comprising an electron beam irradiation chamber accommodating a plurality of electron beam generators, the improvement wherein the acceleration voltage of the electron beam is 300-3,000 KV, the flow velocity of said waste gas is not more than 30 m/sec and the temperature of said waste gas to be treated is not lower than the dew point but no higher than 10020 C., and the center-to-center distance between two neighboring electron beam generators is not shorter than distance X calculated from the following formula:

$$X = 2a + tV$$

wherein
  X = center-to-center distance (m) between two neighboring electron beam generators,
  2a = distance (m) over which absorbed dose extends in waste gas, (the direction of this distance intersects the flow direction of waste gas and the direction opposite thereto; the distance refers to a distance up to a point where substantially no electron beam reaction takes place, and varies depending upon the acceleration voltage of electron beam generators, the temperature of waste gas and the composition of waste gas);
  V = flow velocity (m/sec) of waste gas; and
  t = residence time (sec.) of waste gas in a nonirradiation zone, (this time is 0.01-0.5 seconds).

* * * * *